United States Patent [19]
Tiemann et al.

[11] Patent Number: 5,343,297
[45] Date of Patent: Aug. 30, 1994

[54] CHARGE AMPLIFIER WITH PRECISE, INTEGER GAIN

[75] Inventors: Jerome J. Tiemann, Schenectady; Gerald J. Michon, Waterford; Harold W. Tomlinson, Jr., Scotia, all of N.Y.

[73] Assignee: General Electric Company, Schenectady, N.Y.

[21] Appl. No.: 946,116

[22] Filed: Sep. 17, 1992

[51] Int. Cl.$^5$ .................. H04N 3/14; H04N 5/335
[52] U.S. Cl. .................. 348/301; 257/214; 348/306; 348/299
[58] Field of Search .................. 358/215.27, 213.31, 358/213.11; 257/214, 239

[56] References Cited

U.S. PATENT DOCUMENTS

| | | | |
|---|---|---|---|
| 4,388,532 | 6/1983 | Garcia | 257/214 |
| 4,538,287 | 8/1985 | Roberts et al. | 257/239 |
| 4,631,739 | 12/1986 | Handy | 257/239 |
| 4,684,800 | 8/1987 | Morse et al. | 257/214 |
| 4,752,829 | 6/1988 | Kim | 358/213.31 |
| 5,166,800 | 11/1992 | Mori et al. | 358/213.27 |

OTHER PUBLICATIONS

G. J. Michon et al., "CID Image Sensing", Charge Coupled Devices, Topics in Applied Physics, vol. 38, Chapter 2, Springer-Verlag, Berlin, Heidelberg, New York (1980).

R. S. Akins et al., "Astronomical Applications of Charge Injection Devices", Low Light Level Devices, Society of Photo-Optical Instrumentation Engineers, vol. 78 (1976), pp. 65–71.

E. R. Fossum et al., "A Linear and Compact Charge-Coupled Charge Differencer/Replicator", IEEE Transactions on Electron Devices, vol. ED-31, No. 12, Dec. 1984, pp. 1784–1789.

Primary Examiner—Joseph Mancuso
Assistant Examiner—Wendy R. Greening
Attorney, Agent, or Firm—Jill M. Breedlove; Marvin Snyder

[57] ABSTRACT

In an array of charge injection device (CID) detectors, integer amplification is incorporated into each respective detector of the array. The amplifier for each CID detector in the array performs multiple nondestructive readouts. This provides a gain of N amplification of the signal charge in that detector wherein the signal charge is accurately replicated in a separate charge storage well defined by a magnitude capacitor coupled to the detector. Thus, at the end of the readout process, this separate well contains charge equal to N times the signal charge, N being the number of nondestructive readout cycles in the readout process.

21 Claims, 5 Drawing Sheets

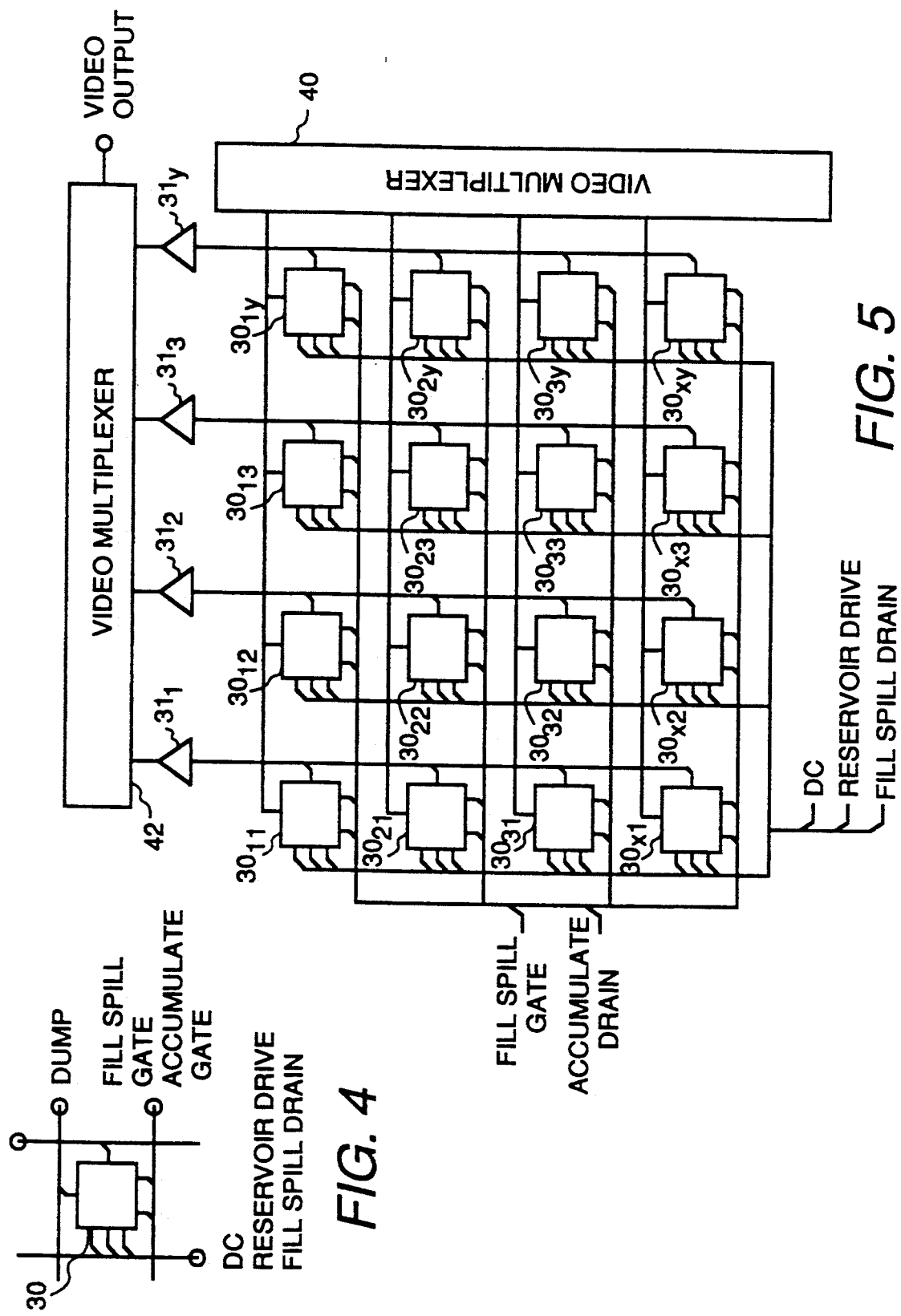

CHARGE AMPLIFIER WITH PRECISE, INTEGER GAIN

BACKGROUND OF THE INVENTION

1. Field of the Invention

The present invention generally relates to amplifiers for solid state photodetectors and imagers, and more particularly to a technique for achieving integer gain for analog charge packets. The technique employs multiple non-destructive readout (NDRO) and summation of analog charge packets to provide an amplifier-per-detector in single detectors and in one and two dimensional arrays of detectors.

2. Description of the Prior Art

Conventional low noise amplifiers are used with optical and infrared detectors for image sensing in many applications. Multiple metal oxide semiconductor field effect transistor (MOSFET) amplifiers have been incorporated into very large charge injection device (CID) sensors, as illustrated for example in G. J. Michon U.S. Pat. No. 4,807,038, issued Feb. 21, 1989 and assigned to the instant assignee. The Michon patent is hereby incorporated by reference. Extremely low loss non-destructive readout (NDRO) of CID image sensors has been demonstrated, with a loss of less than one electron per readout, during continuous NDRO of a stored image. See, for example, "CID Image Sensing" by G. J. Michon and H. K. Burke, Chapter 2, "Charge Coupled Devices", D. F. Barbe (ed), *Topics in Applied Physics*, Vol. 38, Springer-Verlag, Berlin, Heidelberg, N.Y. (1980).

This technique has been used with CID sensors at Kitt Peak National Observatory to produce very wide dynamic range astronomical images as reported by R. S. Akins, C. R. Lynds and R. E. Nelson in "Astronomical Applications of Charge Injection Devices", *Low Light Level Devices, Society of Photo-Optical Instrumentation Engineers*, Vol. 78 (1976), pp. 65–71. In addition, E. R. Fossum and R. C. Barker, in "A Linear and Compact Charge-Coupled Charge Differencer/Replicator", *IEEE Transactions on Electron Devices*, Vol. ED-31, No. 12, Dec. 1984, pp. 1784–1789, describe a charge-coupled circuit for creating a charge packet equal to the difference of two input charge packets.

Optical, infrared, X-ray, and a host of other detectors are performance limited by noise introduced subsequent to the detection process. Amplification at the detection site, prior to the introduction of Johnson noise from conductors, conventional amplifiers and switching noise, would offer significant performance improvements. Arrays of detectors with multiple channels also suffer from variations in offset and gain between the various channels. A charge amplification technique with precise, integer gain that could be used at each of an array of detectors would also offer significant performance improvements against offset and gain variations.

SUMMARY OF THE INVENTION

It is therefore an object of the present invention to provide amplification of signals at the detection sites of a CID array, prior to introduction of Johnson noise from conductors, conventional amplifiers and switching noise.

Another object of the invention is to minimize offset and gain variations between channels in multiple channel CID detection arrays.

The invention employs multiple non-destructive readout (NDRO) and summation of analog charge packets to provide an amplifier-per-detector in arrays of CID detectors. The combination of a CID charge transfer region operated in the NDRO mode, a charge magnitude structure, and an accumulating charge storage region is used to generate a readout signal proportional to charge stored in the CID transfer device. The proportionality constant is increased by reading a selectable number of times (N times, for a gain of N).

BRIEF DESCRIPTION OF THE DRAWINGS

The foregoing and other objects, aspects and advantages will be better understood from the following detailed description of a preferred embodiment of the invention with reference to the drawings, in which:

FIG. 4 is a diagrammatic representation of a single pixel cell such as shown in FIG. 3; and FIG. 5 is a block diagram of an image sensing array system.

DETAILED DESCRIPTION OF A PREFERRED EMBODIMENT OF THE INVENTION

Figure 1:
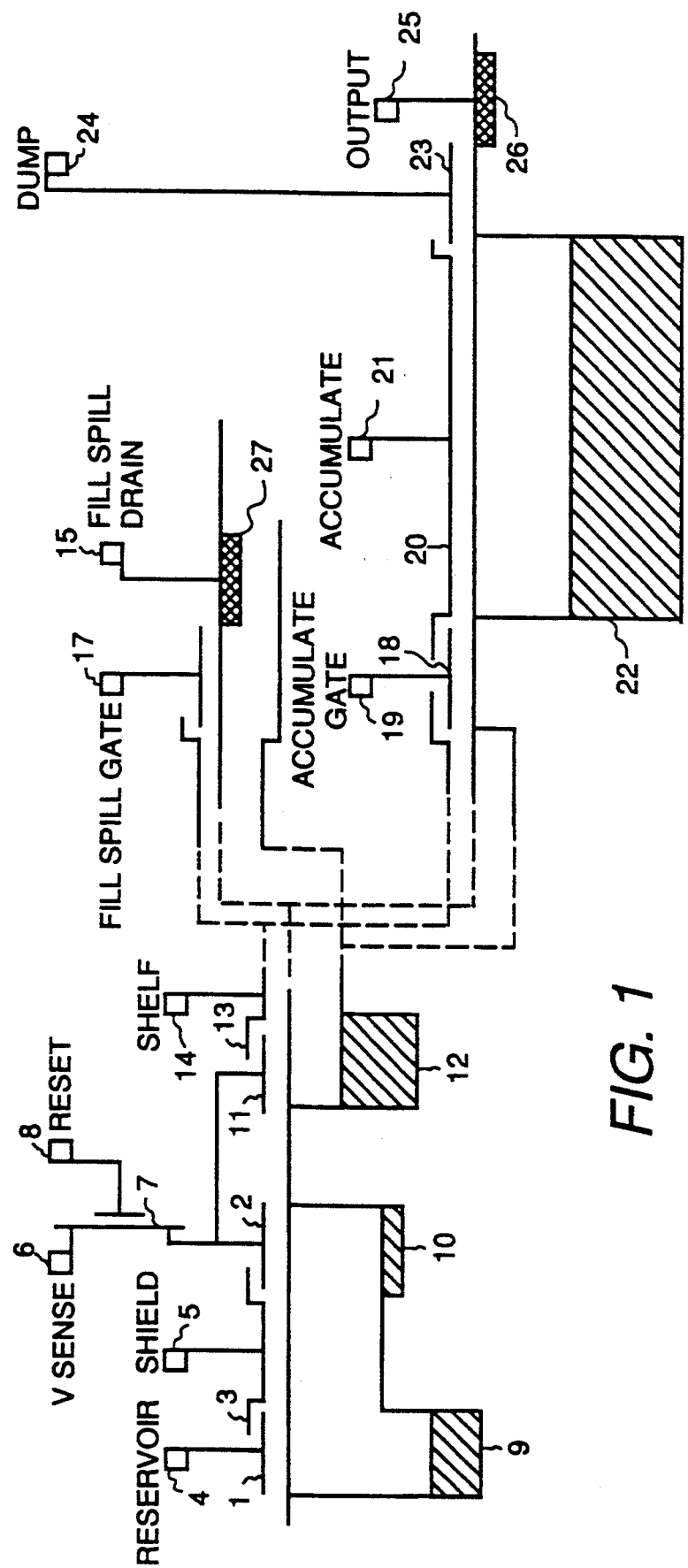
FIG. 1 is a diagrammatic cross-sectional view of a single pixel site in an array of CID pixel sites.

FIG. 1 illustrates a single detector site incorporating the gain of N amplifier according to the invention. It will be understood by those skilled in the art that this could be but one site in an array of similar detector sites. The other detector sites in the array are not shown, for clarity of illustration. Each detector site of the CID array contains basically a dual MOS capacitor wherein one capacitor constitutes a charge reservoir and the other capacitor is used for charge sensing.

In FIG. 1, a reservoir electrode 1 is separated from a sense electrode 2 by a shield electrode 3. Reservoir electrode 1 is connected to a reservoir driver terminal 4. Shield electrode 3 is likewise connected to a shield terminal 5 in the array wiring. Sense electrode 2 is connected to a sense terminal 6 in the array wiring via the source/drain path of a field effect transistor (FET) 7. The gate of FET 7 is connected to a reset terminal 8. Respective reservoir and sense charge storage wells 9 and 10 are formed in the body of the CID detector array, which is comprised of silicon, beneath sense and reservoir electrodes 2 and 1, respectively. Connected in common to sense electrode 2 is a magnitude capacitor electrode 11, beneath which is formed a magnitude capacitor charge storage well 12. A shelf electrode 13 adjacent electrode 11 is connected to a shelf terminal 14 in the array wiring.

Sense electrode 6 constitutes the input terminal to the amplifier portion of the detector site. The amplifier portion of the detector site further includes a fill spill drain 27, a fill spill drain terminal 15, and a fill spill gate electrode 16 connected to a fill spill gate terminal 17. Both terminals 15 and 17 are connected to the array wiring. In addition, an accumulate gate electrode 18 is connected to an accumulate gate terminal 19 and an accumulate electrode 20 is connected to an accumulate terminal 21. A summed charge or charge accumulator well 22 is formed in the silicon body of the device below accumulate electrode 20. Finally, a dump electrode 23 is connected to a dump terminal 24 and an output terminal 25 is coupled to a region 26 of the semiconductor body constituting a drain region. The dump terminal is addressed in an array of sensing sites for readout.

Figure 2:
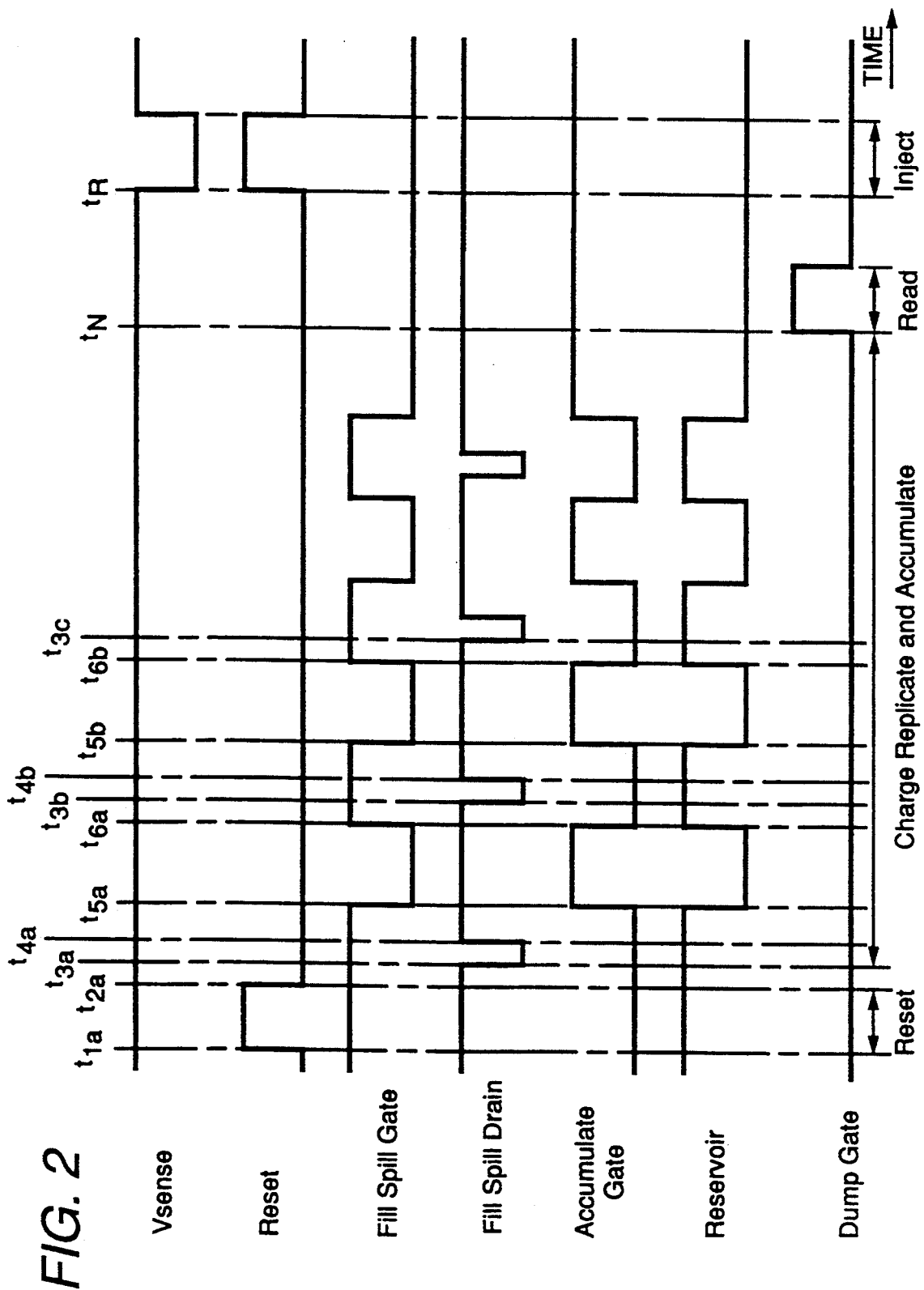
FIG. 2 is a waveform drawing used to explain operation of the gain of N amplifier device of the invention.

Operation of the device is described with reference to FIG. 2 which shows the drive waveforms with respect to time, assuming an n-channel mechanization. However, the device could alternatively be fabricated with a p-channel mechanization. At the beginning of an amplification cycle at time $t_{1a}$, reset terminal 8 is pulsed to precharge the sense and magnitude capacitor charge storage wells 10 and 12, respectively, with a positive voltage, Vsense, at terminal 6. Sense electrode 2 and magnitude capacitor electrode 11 are then allowed to float at time $t_{2a}$ for the remainder of the multiple readout cycle. Accumulate gate 19 is not energized, and fill spill gate 17 is energized. Fill spill drain terminal 15 is then pulsed low at time $t_{3a}$ to fill magnitude capacitor charge storage well 12 and pulsed high at time $t_{4a}$ to drain off the excess charge. Fill spill gate 16 is then deenergized (or shut off) at time $t_{5a}$, and accumulate gate 18 is energized (or opened); at the same time, reservoir electrode 1 is driven low to transfer the negative :CID detector charge in charge storage well 9 to sense charge storage well 10, causing the sense voltage on electrode 2 to decrease. The time at which this occurs is herein referred to as the first charge replication clock phase. This forces a proportional amount of negative charge to flow through shelf electrode 13 into charge accumulator well 22. Reservoir electrode 1 is then driven high at time $t_{6a}$, transferring the negative charge back to reservoir charge storage well 9. The time at which this occurs is herein referred to as the second charge replication clock phase. In addition, magnitude capacitor charge storage well 12 is again filled by first deenergizing (or turning off) accumulate gate 19 and energizing (or turning on) fill spill gate 17. Charge is then transferred again, beginning with filling magnitude capacitor charge storage well 12 starting at time $t_{3b}$, to add a second sample to charge accumulator well 22.

The transfer of charge into charge accumulator well 22 is repeated as many times as desired to obtain a gain equal to the number of transfers. The numbered times designated by the subscript "b" correspond with the same numbered times designated by the subscript "a", etc. After the desired number of readout cycles have been summed, dump electrode 23 is pulsed at time $t_N$ to deliver the accumulated negative charge to output terminal 25 through drain 26 (FIG. 1). The reservoir and sense charge storage wells are then emptied of signal charge by applying low voltages to both electrodes at time $t_R$ to inject the stored charge into the substrate in conventional CID manner.

Figure 3A:
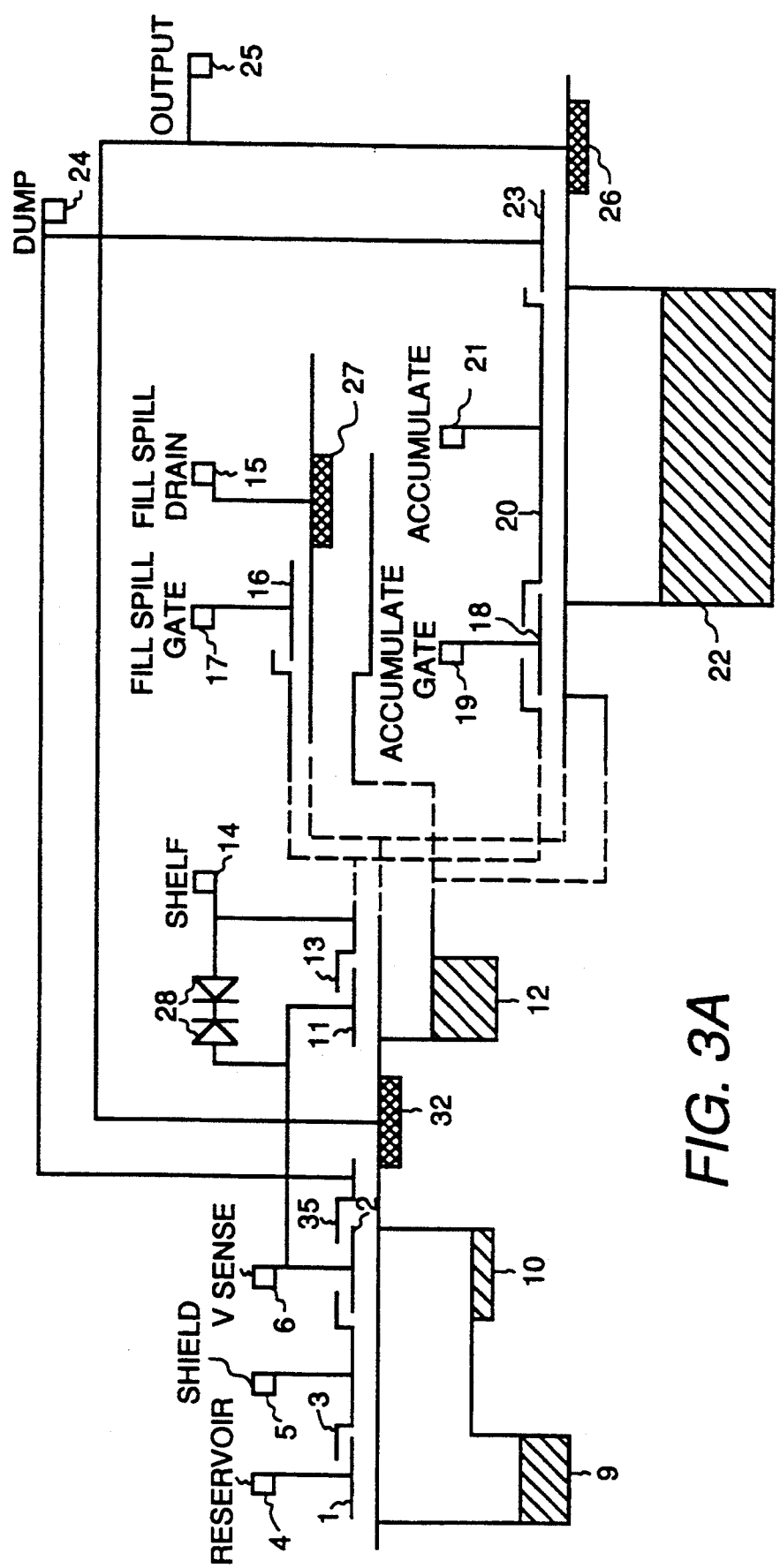
FIGS. 3A and 3B are each diagrammatic cross-sectional views of a single pixel site incorporating different modifications for use in an image sensing array system.

A number of simplifications and alternatives can be implemented in practicing the invention, as shown in FIG. 3A. For example, the accumulation capacitance does not need to be in the form of a depletion region but instead can be a diffused dopant region (or "diffusion"), and it can utilize, as coupling capacitance, electrodes that are metal-metal, metal-polysilicon, or polysilicon-diffusion capacitance, which provide an area advantage and at the same time eliminate need for any voltage on accumulate terminal 21. On the other hand, using: a depletion well capacitance advantageously results in lower noise in the circuit. This is because a depletion well capacitance can be completely emptied of charge, and there is absolutely no uncertainty in the state of the charge contained (i.e., it is zero). A diffused region, either connected to an auxiliary capacitance or not, has reset or kTC noise associated with it at all times, i.e., temporal noise introduced during device reset and sampling.

Sense and reset terminals 6 and 8, respectively, of transistor 7 can be eliminated if gates 2 and 11 are connected to shelf terminal 14 through a sufficiently large resistance. Such resistance, together with the capacitances of gate 2 and 11, should result in a time constant that its very large with respect to the frame time so that its Johnson noise does not contribute appreciably to the total noise. Values in the Gigohm range are preferable, and these can be implemented by back-to-back polysilicon diodes or by depletion devices operating in their sub-threshold region.

In the preferred embodiment, a number of different d.c. voltages are shown. These can all be made equal to a single voltage if appropriate threshold modifying implants are used in the silicon under the various gates. Such single voltage can thus generate, arbitrarily, many different surface potentials.

Figure 3B:
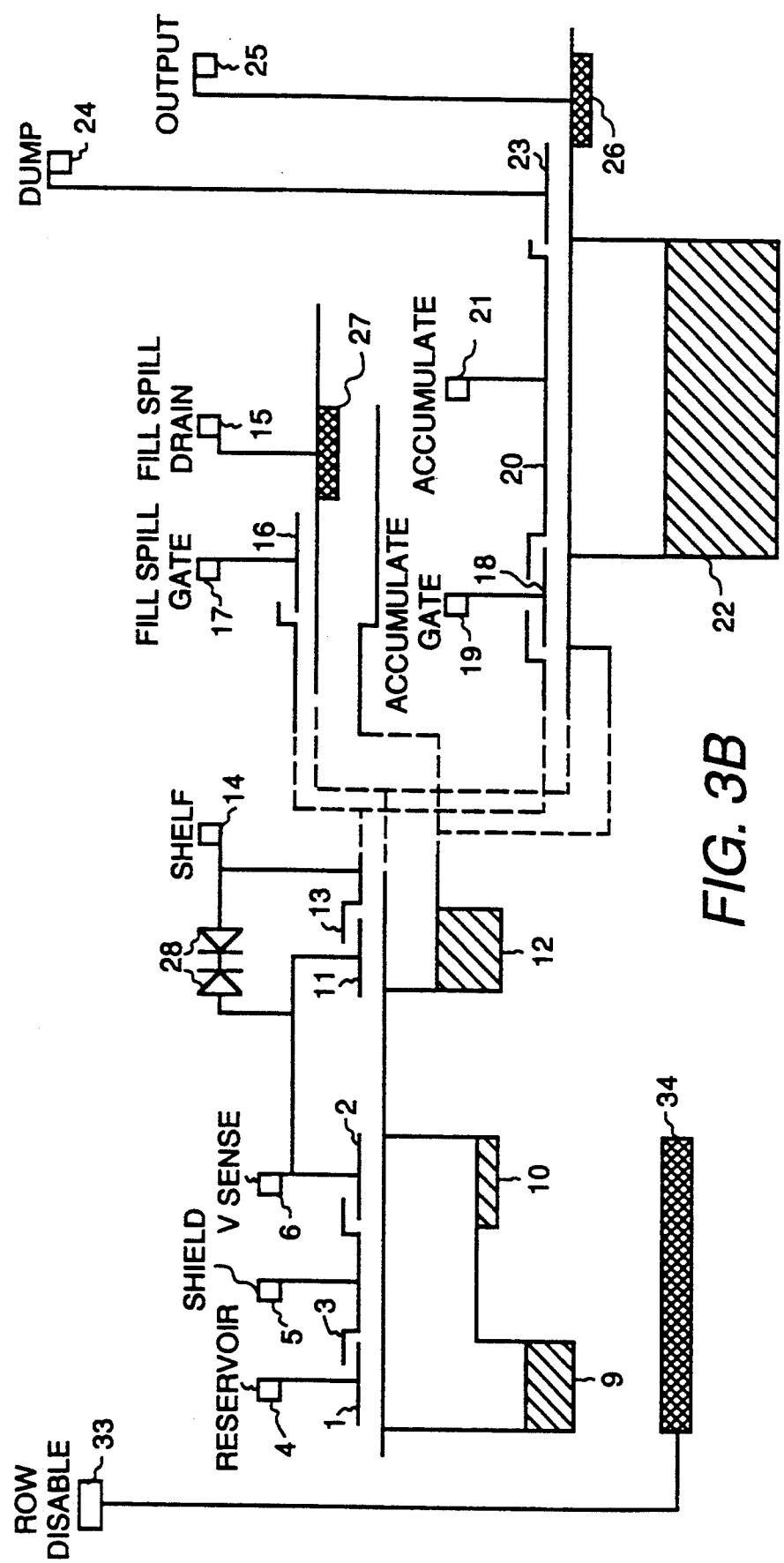

The dump gate signal on terminal 24 can also operate a gate that drains off the signal charge from reservoir charge storage well 9 directly to output drain 26 connected to terminal 25. In such embodiment it is thus not essential to remove the signal charge by injecting it into the bulk of the semiconductor body. Thus the references made to CID sensors herein are not meant to imply only the use of a charge injection mechanism, but rather a cell structure having two or more charge wells with the capability of transferring charge between them. Alternatively, as shown in FIG. 3B, a vertical overflow drain region 34 can be implemented under each row in an array, and a large reverse bias on such drain can be used to empty the signal charge from all pixels in that row. One or the other of these methods must be used if transistor 7 is to be eliminated as described above, since elimination of this transistor also eliminates the possibility of injecting the signal charge in the conventional CID manner.

A CID pixel cell incorporating the aforementioned improvements is shown in each of FIGS. 3A and 3B. The various DC levels needed for setting silicon surface potentials under the shield, shelf, sense, magnitude capacitor, and accumulate electrodes 3, 13, 2, 11 and 20, respectively, of FIG. 1 have been replaced by a single DC level and appropriate ion implants in the silicon body of the CID to set these surface potentials. The sense reset transistor 7 of FIG. 1 has here been eliminated through use of back-to-back polysilicon diodes 28 to form a very high effective resistance between the shelf and sense electrodes 13 and 14, respectively. These changes reduce the number of different servicing lines required for the pixel and, in particular, for an array of pixels for an image sensing system. Need for the charge injection operation used to clear the reservoir-sense charge transfer structure of FIG. 1 has been eliminated in FIG. 3A by transferring that charge through a second dump electrode 35 to an overflow drain 32 and thence to the output during the dump operation. The very high resistance between sense electrode 2 and the shelf DC voltage at terminal 14 allows the sense electrode to be modulated by the signal charge transfer while maintaining the average voltage at an appropriate level. In FIG. 3B, vertical overflow drain 34 is set by a signal on row disable terminal 33 to independently clear the rows of charge and provide a shuttering function, while at the same time requiring less silicon area than the embodiment of FIG. 3A.

FIG. 4 is a representation of a single pixel cell 30 such as shown in FIG. 3, showing the various input and output terminals connected to the cell. Columnar input signals are DC, reservoir drive and fill spill drain voltages, while row input signals are fill spill gate and accumulate gate voltages. A dump signal is also supplied to a row of pixel cells in unison, one row at a time, and the pixel cell output voltages are produced in columnar fashion.

FIG. 5 is a block diagram of an image sensing array system incorporating pixel cell 30 illustrated in FIG. 4. Pixels 30 are designated first by row subscripts 1, 2, 3...x and then by column subscripts 1, 2, 3...y. The gain-of-N operation is performed in parallel on all pixels in the array in this organization. The simple modification of using a line select scanner 40 to enable the reservoir drive of the line to be read subsequently allows performance of the gain-of-N operation on a row-by-row basis. The system operates by using line (row) scanner 40 to dump the accumulated charge from all pixels in the addressed line into sample-hold amplifiers $31_1$, $31_2$, $31_3$...$31_y$ in parallel, where the subscripts 1, 2, 3...y are associated with the respective amplifier's columnar position in the image sensing array system. A video multiplexer 42 transfers the held analog amplifier output signals to its video output port while the next line is addressed by scanner 40. There are numerous variations of this architecture that can include features such as interlace, electronic exposure control, multi-port outputs, fixed pattern noise cancellation, and correlated double sampling that are not specified here but are known to those skilled in the art.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

Having thus described our invention, what we claim as new and desire to secure by Letters Patent is as follows:

1. In an array of rows and columns of charge injection device (CID) detectors, said array being situated on a semiconductor body, each of said CID detectors being coupled, respectively, to a charge amplifier with a gain of N for integer amplification, N being a selectable number, said amplifier comprising:

a clocked reservoir electrode which during a first charge replication clock phase produces a surface potential high enough to expel charge from a reservoir charge storage well in said semiconductor body beneath said reservoir electrode, said reservoir electrode defining said reservoir charge storage well during a second charge replication clock phase;

a sense electrode for defining a sense charge storage well in said semiconductor body beneath said sense electrode that is capable of receiving the charge expelled from said reservoir charge storage well, said sense electrode being coupled to a magnitude capacitor associated with a respective one of said CID detectors of said array and being responsive to a sense signal for resetting the amplifier;

a magnitude capacitor electrode connected to said sense electrode for defining a magnitude capacitor charge storage well in said semiconductor body beneath said magnitude capacitor electrode, said magnitude capacitor charge storage well having a charge storage capacity determined by the sense electrode potential;

means for precharging said sense and magnitude capacitor electrodes to a predetermined reset voltage during said first charge replication clock phase;

means coupled to said magnitude capacitor electrode and operative during said second charge replication clock phase for filling to substantially full capacity said magnitude capacitor charge storage well;

a charge accumulation electrode;

a charge accumulation well situated in said semiconductor body beneath said charge accumulation electrode; and charge transfer means for transferring charge from said reservoir charge storage well to said sense charge storage well and from said magnitude capacitor charge storage well to said charge accumulation well during said first charge replication clock phase and for transferring charge from said sense storage well to said reservoir charge storage well during said second charge replication clock phase, thereby making available charge storage capacity in said sense charge storage well in an amount equal to the transferred charge, whereupon said means for filling said magnitude capacitor charge storage well again fills said magnitude capacitor charge storage well and said charge transfer means again transfers charge so that, over repeated cycles of charge transfer, a charge proportional to N times the charge originally in said reservoir charge storage well is accumulated in said charge accumulation well.

2. The apparatus of claim 1 wherein said means for precharging comprises:

a sense voltage source;

a field effect transistor coupled between said sense voltage source and said sense and magnitude capacitor electrodes; and means for gating said field effect transistor on for a predetermined interval during each cycle of charge transfer to precharge said sense charge storage well and said magnitude capacitor charge storage well.

3. The apparatus of claim 1 wherein said means for filling said magnitude capacitor charge storage well comprises:

a fill spill drain for injecting charge and draining off excess charge; and a fill spill gate coupled between said fill spill drain and said magnitude capacitor charge storage well, said fill spill gate being adapted to be rendered conductive to fill said magnitude capacitor charge storage well from said fill spill drain and to drain excess charge from said magnitude capacitor charge storage well and adapted to be rendered nonconductive when charge is transferred by said charge transfer means.

4. The apparatus of claim 3 further comprising an accumulate gate coupled between said magnitude capacitor electrode and said charge accumulation electrode, said accumulate gate being adapted to be rendered conductive only when said charge transfer means transfers charge from said reservoir charge storage well to said sense charge storage well.

5. The apparatus of claim 4 further comprising an output terminal, and a dump gate coupled between said charge accumulation electrode and said output terminal, said dump gate being adapted to be rendered conductive after N transfer cycles to provide at said output terminal a charge proportional to charge accumulated in said charge accumulation well.

6. The apparatus of claim 4 including a shelf electrode coupling said magnitude capacitor electrode to said accumulate gate and said fill spill gate.

7. The apparatus of claim 6 including resistance means coupling said magnitude capacitor electrode to said shelf electrode.

8. The apparatus of claim 7 wherein said resistance means comprises a pair of diodes connected back-to-back.

9. The apparatus of claim 1 wherein said charge accumulation well comprises a depletion region in said semiconductor body.

10. The apparatus of claim 1 wherein said charge accumulation well comprises a diffused region in said semiconductor body.

11. The apparatus of claim 1 wherein said charge accumulation electrode comprises one of the group consisting of metal-metal, metal-polysilicon and polysilicon-diffusion.

12. The apparatus of claim 1 including a vertical overflow drain region in said semiconductor body beneath said reservoir charge storage well and said sense charge storage well, and a row disable electrode coupled to said drain region for independently clearing charge from each row of said array.

13. A charge amplifier with a gain of N for integer amplification of a charge source output signal, N being a selectable number, said amplifier being situated on a semiconductor body and comprising:
   a clocked reservoir electrode which during a first charge replication clock phase produces a surface potential high enough to expel charge from a reservoir charge storage well beneath said reservoir electrode, said reservoir electrode defining said reservoir charge storage well during a second charge replication clock phase;
   a sense electrode for defining a sense charge storage well in said semiconductor body beneath said sense electrode that is capable of receiving the charge expelled from said reservoir charge storage well, said sense electrode being responsive to a sense signal for resetting said amplifier;
   a magnitude capacitor electrode connected to said sense electrode for defining a magnitude capacitor charge storage well in said semiconductor body beneath said magnitude capacitor electrode, said magnitude capacitor charge storage well having a charge storage capacity determined by the sense electrode potential;
   means for precharging said sense and magnitude capacitor electrodes to a predetermined reset voltage said first charge replication clock phase;
   means coupled to said magnitude capacitor electrode and operative during said second charge replication clock phase for filling to substantially full capacity said magnitude capacitor charge storage well;
   a charge accumulation electrode;
   a charge accumulation well situated in said semiconductor body beneath said charge accumulation electrode; and
   charge transfer means for transferring charge from said reservoir charge storage well to said sense charge storage well and from said magnitude capacitor charge storage well to said charge accumulation well during said first charge replication clock phase and for transferring charge from said sense storage well to said reservoir charge storage well during said second charge replication clock phase, thereby making available charge storage capacity in said sense charge storage well in an amount equal to the transferred charge, whereupon said means for filling said magnitude capacitor charge storage well again fills said magnitude capacitor charge storage well and said charge transfer means again transfers charge so that, over repeated cycles of charge transfer, a charge proportional to N times the charge originally in said reservoir charge storage well is accumulated in said charge accumulation well.

14. The amplifier of claim 13 wherein said means for precharging comprises:
   a sense voltage source;
   a field effect transistor coupled between said sense voltage source and said sense and magnitude capacitor electrodes; and
   means for gating said field effect transistor on for a predetermined interval during each cycle of charge transfer to precharge said sense charge storage well and said magnitude capacitor charge storage well.

15. The amplifier of claim 13 wherein said means for filling said magnitude capacitor charge storage well comprises:
   a fill spill drain for injecting charge and draining off excess charge; and
   a fill spill gate coupled between said fill spill drain and said magnitude capacitor charge storage well, said fill spill gate being adapted to be rendered conductive to fill said magnitude capacitor charge storage well from said fill spill drain and to drain excess charge from said magnitude capacitor charge storage well and adapted to be rendered nonconductive when charge is transferred by said charge transfer means.

16. The amplifier of claim 15 further comprising an accumulate gate coupled between said magnitude capacitor electrode and said charge accumulation electrode, said accumulate gate being adapted to be rendered conductive only when said charge transfer means transfers charge from said reservoir charge storage well to said sense charge storage well.

17. The amplifier of claim 16 further comprising an output terminal, and a dump gate coupled between said charge accumulation electrode and said output terminal, said dump gate being adapted to be rendered conductive after N transfer cycles to provide at said output terminal a charge proportional to charge accumulated in said charge accumulation well.

18. The apparatus of claim 13 wherein said charge accumulation well comprises a depletion region in said semiconductor body.

19. The apparatus of claim 13 wherein said charge accumulation well comprises a diffused region in said semiconductor body.

20. The apparatus of claim 13 wherein said charge accumulation electrode comprises one of the group consisting of metal-metal, metal-polysilicon and polysilicon-diffusion.

21. The apparatus of claim 17 including an overflow drain, a second dump electrode coupling said sense electrode to said overflow drain, means coupling said second dump electrode to said dump gate, and means coupling said overflow drain to said output terminal.

* * * * *